March 26, 1946. W. H. BENNETT 2,397,118
METHOD AND APPARATUS FOR REDUCING STATIC
INTERFERENCE IN AIRCRAFT RADIO
Filed Sept. 10, 1942
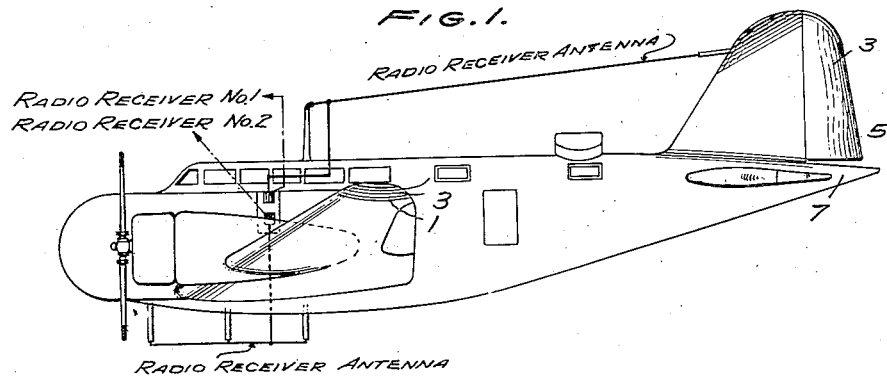
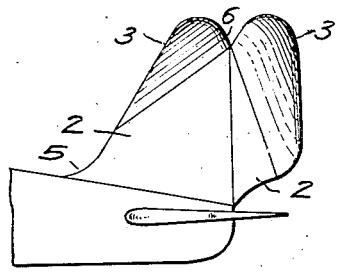
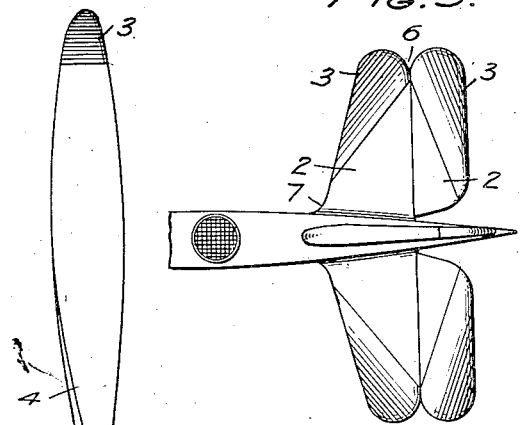
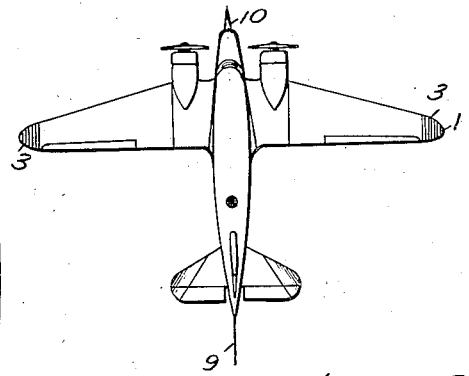
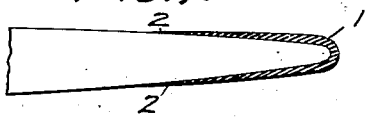
INVENTOR
WILLARD H. BENNETT
BY William D. Hall.
ATTORNEY Patented Mar. 26, 1946

2,397,118

UNITED STATES PATENT OFFICE 2,397,118

METHOD AND APPARATUS FOR REDUCING STATIC INTERFERENCE IN AIRCRAFT RADIO

Willard H. Bennett, Columbus, Ohio

Application September 10, 1942, Serial No. 457,839

13 Claims. (Cl. 175—264)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to electrical apparatus and more particularly to the reduction of undesirable interference in radio caused by corona discharge.

It has been found that radio interference known as precipitation static is, in aircraft, caused to some extent by a corona discharge induced from various sharp exposed portions of the aircraft by nearby charged clouds and air masses. Low pressure favors corona formation. The edges and types of various portions of the aircraft such as propeller and wings are likely sources due to their sharp form, exposed position, and high velocity with the attendant pressure reduction.

It is an object of this invention to reduce or eliminate the corona discharge from sharp exposed surfaces of an aircraft or other vehicle. Another object is to reduce the field intensity of a charge on the edges of the exposed surface. A further object is to provide conducting rings to discharge minute corona currents.

Other objects will be apparent on reading the specification, the appended claims and referring to the accompanying drawing.

Fig. 1 is a view of an airplane with radio receivers and antennas, equipped in accordance with the principle of this invention.

Fig. 2 is a plan view of a wing of an aircraft with this invention thereon.

Figs. 3, 4, and 5 are views respectively of a propeller, rudder assembly, and elevator assembly of an airplane with the invention thereon.

Fig. 6 is a plan view of an airplane equipped in accordance with the principles of the invention.

Fig. 7 is a cross sectional view of a wing of an aircraft with this invention thereon.

Corona discharge is characterized by the fact that at low or intermediate field intensities, no current flows, but at a high field intensity which is critical for each portion of the aircraft, the current of discharge sets in quite abruptly. According to this invention, the method for suppressing and preventing corona discharge consists in influencing the electric field automatically at each salient part of the structure in a manner which will reduce the field intensity at that part of the structure to a point below the critical onset value.

Referring to Figure 2, wing tip 1 is coated with an electrical insulating compound 2 such as, for instance, rubber. Lines of conducting material 3, are applied to the insulating surface. These conducting lines 3 may be of a metallical conducting substance or of electrical conducting paints including those that may be fired on. They extend above and below the wing tip 1, as shown in the drawing. In the preferred form the lines should be narrow and close together. The values are not at all critical. In the operation of this method, it is preferable for the edge of each line or ring to lay on a surface which is approximately parallel with the direction of the electric field, but wide deviations in angle from this condition are permissible.

As nearby charged cloud masses seek to draw corona from the wing tip, the outermost lines or rings will discharge to acquire a charge of the same polarity as the charge of the cloud mass. Any inter-ring gap where a disproportionally large potential difference is occurring will first pass the corona onset conditions. A minute corona discharge will pass between the rings until sufficient charge has passed to reduce the potential difference between the rings below corona onset conditions. As the outside ring discharges the next adjacent rings will receive successively less amounts of the same polarity. Since the rings have such small capacities, the corona current necessary for such redistribution of potential never becomes great enough to cause appreciable radio interference. In this way, each line or ring will discharge or charge until it falls below corona onset conditions and all discharge has stopped.

Fig. 3 illustrates a propeller 4 with the tips similarly coated with insulating material 2 and conducting rings 3. The same principles as described above apply.

The application of the method to the tail assembly of an airplane is shown in Figs. 4 and 5 in which the rudder assembly surfaces 5 and elevation assembly surfaces 7 are coated with insulating material 2 and conducting rings 3. In a preferred embodiment, these surfaces are illustrated as being rounded in at 6—a and 6—b, the exposed ends of hinges, to permit geometrical guarding of the hinge ends which are difficult to cover with dielectric.

In the past, the corona has been reduced to some extent by use of pointed surfaces on airplanes. For example, sharply pointed members and trailing wires have been used. These expedients, while helpful, are not wholly effective. However, if the means and method of my invention are used in conjunction with these other expedients, the combination results in reduction of corona to a minimum.

When corona would be very strong without either the prior art expedients or my invention, the use of the prior art expedients in combination with my invention cooperates in that the prior art expedients reduce the corona to a sufficient degree that my invention can function to best advantage. In the drawing, I have illustrated expedients in the way of pointed prongs 10 on the nose of Figure 6 and a trailing wire 9. As has been stated, the prongs 10 and trailing wire 9 may cooperate with the conducting rings 3, under conditions of large corona, by reducing the corona to a point where rings 3 have maximum effectiveness.

So far as the broader aspects of my invention are concerned, the claims are not limited to the combination of my idea with these prior art expedients, but in the narrower claims this combination is called for.

I claim to have invented:

1. The combination of an aircraft equipped with radio, a wing on said aircraft, a coating of electrical insulating material on said wing covering a portion extending inwardly from the tip thereof, a plurality of individual lines of electrical conducting material on said insulating material, said lines being substantially parallel to the edge of said wing tip, the extent of said covered portion and the number of conducting lines being sufficient to reduce the static interference in said radio.

2. The combination of an aircraft equipped with radio, a tail assembly on said aircraft, a coating of electrical insulating material on portions extending inwardly from exposed edges of said tail assembly, a plurality of individual lines of an electrical conducting material on said insulating material, said conducting lines being substantially parallel to said exposed edges of said tail assembly, the extent of said covered portion and the number of said conducting lines being sufficient to reduce static interference in said radio.

3. On an aircraft, a coating of an electrical insulating material on portions along the edge of salient structures of said aircraft, said insulating material forming a surface on which there is a plurality of lines of an electrical conducting substance, the edges of said lines being substantially parallel to the edges of said salient structure.

4. The combination of an aircraft having a radio, a salient structure on said aircraft, a coating of an electrical insulating material on said salient structure, a plurality of individual lines of an electrical conducting substance on said insulating material, the edges of said lines being substantially parallel to the edges of said salient structure, said insulating material and said conducting lines covering a portion of said salient structure extending inwardly from the edge thereof, sufficient to reduce the static interference in said radio.

5. The combination of an aircraft equipped with radio, a salient structure on said aircraft, a coating of insulating material on said salient structure covering a portion extending inwardly from the edge thereof, a plurality of individual lines of electrical conducting material on said insulating material, the edges of said conducting lines being on a surface substantially parallel to the direction of the electric field on said salient structure, said covered portion of salient structure being sufficient to reduce the static interference in said radio.

6. The combination with an aircraft having a radio, of an electrical insulating coating on exposed edges and tips of the surface of said aircraft, and a plurality of substantially parallel spaced lines of electrical conducting material thereon, said lines being spaced from each other in such manner as to form leakage paths for electricity across said lines.

7. The device defined by claim 5 including in addition a trailing wire electrically connected to said aircraft.

8. The device defined by claim 5 including in addition a pointed member electrically connected to the aircraft.

9. The device as defined by claim 6 in which said aircraft is metallic and including an electrical conductor having a sharp edge electrically connected to the aircraft.

10. In a device for reducing static electric charges on an object, a coating of electrical insulating material on portions of the object, and a plurality of spaced lines of electrical conducting material on said coating, said lines being spaced from each other in such manner as to form an electric discharge gap for said static electric charges.

11. Means for dissipating static electricity at a relatively low potential from a machine having an edge from which static tends to discharge, said means comprising, a plurality of lines of material having a greater electrical conductivity than that of the material of which the surface of the machine is made, said lines being spaced apart from each other a substantially uniform distance which is sufficient to provide a plurality of gaps located along a line substantially perpendicular to said edge across which gaps the static discharges in cascade.

12. Means for dissipating static electricity at a relatively low potential from a machine having an edge from which static tends to discharge, said means comprising, a plurality of lines of electrically conductive material, said lines being spaced apart from each other a substantially uniform distance which is sufficient to provide a plurality of gaps located along a line at an angle to said edge across which gaps the static discharges in cascade, and a layer of insulating material covering a portion of the surface of said machine and extending along the major portion of said edge and supporting said lines thereon.

13. A process of dissipating static electricity at a relatively low potential from a machine having an edge from which static tends to discharge, said process comprising, conducting static electricity in a direction substantially parallel with said edge so as to prevent the accumulation of any appreciable electrical potential between points at substantially the same distance from said edge, and causing said static electricity to discharge by jumping across a plurality of gaps extending in cascade in a direction substantially perpendicular to said edge.

WILLARD H. BENNETT.